Oct. '18, 1927.
C. W. HOUGH
1,646,292
METHOD OF DIRECTING LIGHT RAYS UPON LIGHT SENSITIVE ELEMENTS
Original Filed Oct. 22, 1925
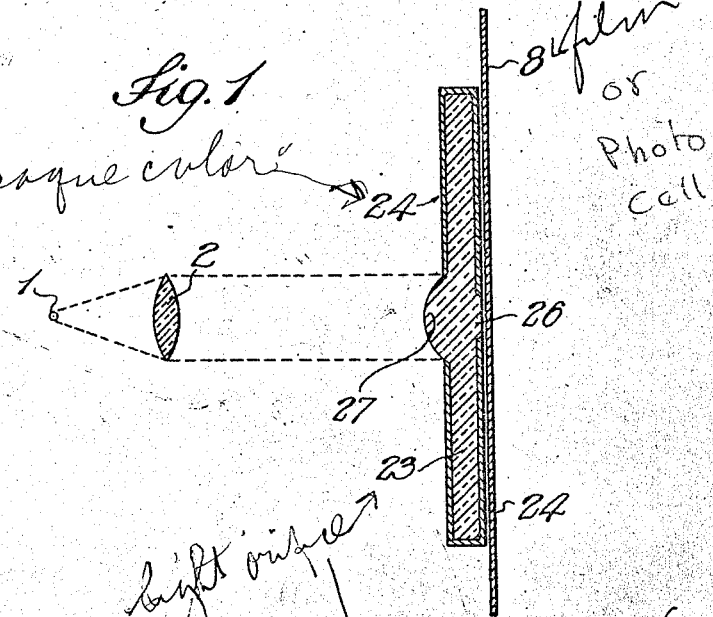
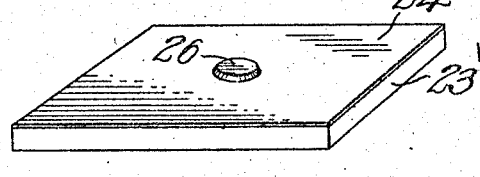
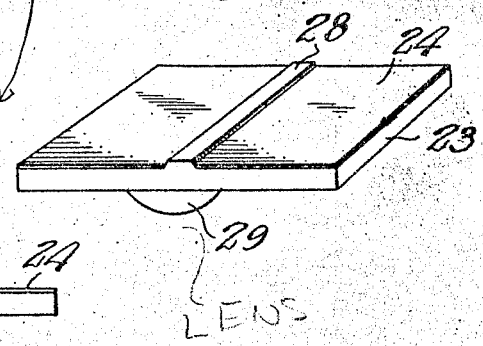
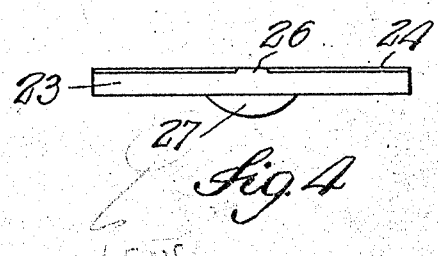
Inventor:
Clinton W. Hough
By John B. Brady
Attorney Patented Oct. 18, 1927.

1,646,292

UNITED STATES PATENT OFFICE.

CLINTON W. HOUGH, OF BOONVILLE, NEW YORK, ASSIGNOR TO WIRED RADIO, INC., OF NEW YORK, N. Y., A CORPORATION OF DELAWARE.

METHOD OF DIRECTING LIGHT RAYS UPON LIGHT-SENSITIVE ELEMENTS.

Application filed October 22, 1925, Serial No. 64,153. Renewed August 17, 1927.

My invention relates broadly to optics and more particularly to methods of directing light upon light sensitive elements, such as sensitized films, plates or light sensitive cells.

One of the objects of my invention is to provide a method of directing light upon light sensitive elements, such as sensitive films, plates or light sensitive cells in such manner that the orifice through which the light passes is maintained clear of dust particles or other foreign matter at all times to prevent interference with the free passage of the rays of light therethrough.

Still another object of my invention is to provide a construction of orifice for directing light in a beam of a desired shape and size, while preventing interference by dust particles or foreign matter. with the free passage of light rays through the orifice.

A further object of my invention is to provide a construction of orifice for directing light rays in a concentrated beam upon a light sensitive object, where light may be freely passed through the orifice while an opaque wall is provided around the orifice for concentrating the rays of light through the orifice against the light sensitive object.

A still further object of my invention is to provide a construction of orifice for directing light against a light sensitive object where various shapes and sizes may be readily imparted to the orifice and the light confined in a path through the orifice by an opaque surface covering located around the orifice.

My invention has particular reference to television, the transmission and reception of pictures by line wire or space radio, and the photographic transmission and reception of telegraphic signals, where light is used as the medium for reproducing an object on a sensitized film or plate or for varying the degree of conductivity of a light sensitive cell. It is well known in the art of transmitting pictures or images by telegraph or radio signals to cause a beam of light to pass through a narrow slit or orifice behind which a sensitive film may be moving in order to record the vibrations or changes in light intensity which correspond to the frequency of sound vibrations or to the elements of pictures or messages. In some methods a beam of light is swung back and forth over a slit and results in a wavy line of light being impressed on the moving sensitized film. In other systems the intensity of the light beam is varied and a line of varying intensity or of intermittent bands or dots of light are recorded on the film. In making slits or openings, through which the beam of light passes to the sensitive film, it is difficult to adjust these accurately because of the rather small dimensions of the slit, and in operation the slit or other shaped orifice rapidly becomes clogged with particles of dust or from particles of the film so that the volume of light passing through is reduced or entirely shut off. Light apertures of various shapes and dimensions are required. They may be in the shape of a longitudinal line of light of any required width and length or in the shape of a concentrated beam which may be circular, oval, square, rectangular or of any geometrical or irregular outline. It is important that the light be concentrated for the purpose of making a definite record on the film and that the orifice or aperture does not clog up with particles of dust. It is also important that the light orifice does not scratch the film and that it be in close proximity to the film in order to obtain a sharp record.

My invention consists of a transparent material such as glass, quartz, diamond or other substance having a portion thereof rendered opaque to the transmission of light rays and a portion arranged to concentrate light rays in a predetermined direction. The transparent material may take any desired shape in accordance with the shape of orifice which it is necessary to present to the sensitive film, plate or light sensitive cell. The material has a transparent lateral axis through which the light rays may be passed, while an opaque surface is provided for concentrating the light rays in the direction of the orifice.

My invention will be more clearly understood from the specification hereinafter following, by reference to the accompanying drawing, in which;

Figure 1 shows an optical system and light orifice constructed in accordance with my invention and arranged with relation thereto; Fig. 2 is a perspective view of one form in which the light orifice of my invention may be constructed; Fig. 3 is a perspective view of a further modified construction of light orifice; and Fig. 4 is an end view of the light orifice of the form of my invention shown in Fig. 3.

Referring to the drawings in more detail reference character 1 represents a source of light rays which are focused through lens 2 and directed upon the light orifice 23. As shown more particularly in Fig. 2 the light orifice may be formed from flat material. The surface 24 of the plate 23 may be rendered opaque by a covering of paint or enamel applied to the surface or by means of a color such as ruby or orange or other "safe light" which may be "flashed" on or "fired" in the surface of the plate. The cone is then mounted in a holder of any suitable material such as glass, bakelite, metal of any kind or any other material which will support the plate adjacent the film 8.

The transparent plate 23 is formed with a slight point 26 or longitudinally extending ridge 28 as shown in Figs. 3 and 4 and the opaque color 24 applied to the surface of the plate 23. The point 26 or ridge 28 may then be ground off flush with the remaining surface thereby providing a transparent point or line for the transmission of the light rays. The light rays may be further concentrated through the orifice by means of a lens 27 or 29 which may be formed on the opposite surface of the plate 23 conforming in shape with the point 26 or ridge 28, that is the lens portion 27 may be circular or it may extend laterally across the plate 23.

The raised portion 26 or 28 is positioned closely adjacent the film forming a small light slit which dust or other particles from the film cannot clog up and which will concentrate the light upon the sound record of the film for reproduction of sound therefrom at maximum amplitude.

It will be understood that the size of the light orifices have been shown greatly exaggerated in size and it will be understood that in practice the orifice is extremely minute. In order to properly illustrate the invention, however, I have multiplied the size of the orifice many times.

I have illustrated my invention in certain preferred embodiments, but I desire that it be understood that modifications may be made and that no limitations upon the invention are intended other than are imposed by the scope of the appended claims.

What I claim as new and desire to secure by Letters Patent of the United States is as follows:

1. In an optical system the combination of a source of light rays, means for concentrating said light rays in a beam, means directly adjacent a light sensitive element for directing said beam of light rays thereupon, comprising a flat transparent sheet of material, a raised portion in the shape of a light orifice on one side of said flat sheet of material and located directly adjacent said light sensitive element, and an opaque coating on the side of said plate surrounding said orifice for directing all of said light rays through said orifice.

2. In a light directing system the combination of a source of light rays, means for concentrating said light rays in a beam, means directly adjacent a light sensitive element for directing said beam of light rays thereupon, comprising a flat sheet of material transparent to the passage of light rays, said material having an integral portion thereof raised out of the plane of its surface and shaped to provide a light orifice transparent to the passage of light rays and an opaque coating on the surface of said plate immediately surrounding said orifice for restricting the passage of light through said plate to the area of said orifice.

In testimony whereof I affix my signature.

CLINTON W. HOUGH.